United States Patent
Chae

(10) Patent No.: US 11,755,061 B2
(45) Date of Patent: Sep. 12, 2023

(54) SIGNAL GENERATOR, METHOD OF GENERATING SIGNAL, AND DISPLAY DEVICE

(71) Applicant: Samsung Display Co., Ltd., Yongin-Si (KR)

(72) Inventor: Se-Byung Chae, Seongnam-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 17/969,581

(22) Filed: Oct. 19, 2022

(65) Prior Publication Data

US 2023/0123934 A1 Apr. 20, 2023

(30) Foreign Application Priority Data

Oct. 19, 2021 (KR) ......................... 10-2021-0139127

(51) Int. Cl.
G06F 1/12 (2006.01)
G06F 1/08 (2006.01)
G09G 3/3225 (2016.01)
G09G 3/32 (2016.01)

(52) U.S. Cl.
CPC ................. G06F 1/12 (2013.01); G06F 1/08 (2013.01); G09G 3/32 (2013.01); G09G 3/3225 (2013.01); G09G 2310/08 (2013.01)

(58) Field of Classification Search
CPC .... G06F 1/08; G06F 1/12; G09G 3/32; G09G 3/3225; G09G 2310/08
See application file for complete search history.

(56) References Cited

U.S. PATENT DOCUMENTS

| 2008/0180430 A1* | 7/2008 | Eriguchi | G09G 3/3648 345/212 |
| 2013/0141404 A1* | 6/2013 | Kim | G09G 5/003 345/204 |

FOREIGN PATENT DOCUMENTS

KR 10-0747668 B1 8/2007
KR 10-2020-0024984 A 3/2020

\* cited by examiner

*Primary Examiner* — Hang Lin
(74) *Attorney, Agent, or Firm* — Innovation Counsel LLP

(57) ABSTRACT

A signal generator may include a reference horizontal synchronization signal generation block which generates reference horizontal synchronization signals based on a number of clock signals per a horizontal time, a frame clock calculation block which calculates a first frame clock number based on a number of the clock signals per the horizontal time, a frame clock comparation block which calculates a clock offset by comparing the first frame clock number and a second frame clock number generated based on a number of the clock signals per a frame time, a clock distribution block which generates horizontal synchronization signals by distributing a number of the clock signals corresponding to the clock offset to the reference horizontal synchronization signals, and a vertical synchronization signal generation block which generates a vertical synchronization signal based on the horizontal synchronization signals.

20 Claims, 12 Drawing Sheets

FIG. 7

| HORIZONTAL TIME | 1 | 2 | 3 | 4 | ... | 23 | 24 | 25 | 26 | 27 | 28 | 29 | 30 | 31 | 32 | ... | 2821 | 2822 | 2823 | 2824 | 2825 | 2826 | 2827 | 2828 |
|---|---|---|---|---|---|---|---|---|---|---|---|---|---|---|---|---|---|---|---|---|---|---|---|---|
| PERIOD | VBP | | | | | | | ACTIVE | | | | | | | | | | | | | | | | VFP |
| NUMBER OF CLOCK SIGNALS BEFORE COMPENSATION | 244 | 244 | 244 | 244 | ... | 244 | 244 | 244 | 244 | 244 | 244 | 244 | 244 | 244 | 244 | ... | 244 | 244 | 244 | 244 | 244 | 244 | 244 | |
| NUMBER OF DISTRIBUTED CLOCK SIGNALS | 1 | 0 | 0 | 1 | ... | 0 | 0 | 1 | 0 | 0 | 1 | 0 | 0 | 1 | 0 | ... | 1 | 0 | 0 | 1 | 0 | 0 | 1 | 0 |
| NUMBER OF CLOCK SIGNALS AFTER COMPENSATION | 245 | 244 | 244 | 245 | ... | 244 | 244 | 245 | 244 | 244 | 245 | 244 | 244 | 245 | 244 | ... | 245 | 244 | 244 | 245 | 244 | 244 | 245 | 244 |

SIGNAL GENERATOR, METHOD OF GENERATING SIGNAL, AND DISPLAY DEVICE

CROSS-REFERENCE TO RELATED APPLICATION(S)

This application claims priority under 35 USC § 119 to Korean Patent Application No. 10-2021-0139127 filed on Oct. 19, 2021, in the Korean Intellectual Property Office (KIPO), the entire disclosure of which is incorporated by reference herein.

BACKGROUND

1. Field

Embodiments relate to a display device. More particularly, embodiments relate to a signal generator, a method of generating a signal, and a display device including the signal generator.

2. Description of the Related Art

A display device may generate synchronization signals for synchronization with externally input image data. The synchronization signals may include a horizontal synchronization signal and a vertical synchronization signal. The synchronization signals may be generated based on clock signals generated by a clock oscillator. For example, the horizontal synchronization signal may be generated by counting the clock signals and the vertical synchronization signal may be generated by counting the horizontal synchronization signals.

Since the horizontal synchronization signal is generated by the counting clock signals and the vertical synchronization signal is generated by counting the horizontal synchronization signals, a deviation between a frequency of an ideal vertical synchronization signal and a frequency of the vertical synchronization signal generated by counting the horizontal synchronization signals may occur due to a calculation of the vertical synchronization signal. Specifically, as a frequency of the clock signals decreases, the deviation between the frequency of the ideal vertical synchronization signal and the frequency of the vertical synchronization signal generated by counting the horizontal synchronization signals may increase.

A length of the clock signal generated by the clock oscillator may vary depending on a temperature of the display device or the like. Since the horizontal synchronization signal is generated by counting the clock signals and the vertical synchronization signal is generated by counting the horizontal synchronization signals, a deviation between the frequency of the ideal vertical synchronization signal and the frequency of the vertical synchronization signal generated by counting the horizontal synchronization signals may occur due to the temperature of the display device or the like.

SUMMARY

Embodiments provide a signal generator that generates an accurate vertical synchronization signal and a display device including the same.

Embodiments provide a method of generating a signal for generating an accurate vertical synchronization signal.

A signal generator according to an embodiment may include: a reference horizontal synchronization signal generation block which generates reference horizontal synchronization signals based on a number of clock signals per a horizontal time; a frame clock calculation block which calculates a first frame clock number based on a number of the clock signals per the horizontal time; a frame clock comparison block which calculates a clock offset by comparing the first frame clock number and a second frame clock number generated based on a number of the clock signals per a frame time; a clock distribution block which generates horizontal synchronization signals by distributing a number of the clock signals corresponding to the clock offset to the reference horizontal synchronization signals; and a vertical synchronization signal generation block which generates a vertical synchronization signal based on the horizontal synchronization signals.

In an embodiment, the signal generator may further include: a deviation detection block which generates a clock gain by comparing the clock signals and reference clock signals provided from outside; and a clock compensation block which calculates the second frame clock number by multiplying the clock gain by the number of the clock signals per the frame time.

In an embodiment, the clock gain may be a ratio of a number of the clock signals per a unit time to a number of the reference clock signals per the unit time.

In an embodiment, the clock offset may be a difference between the first frame clock number and the second frame clock number.

In an embodiment, the clock distribution block may distribute the clock signals every two horizontal times (2H) to the reference horizontal synchronization signals.

In an embodiment, the clock distribution block may distribute the clock signals corresponding to the clock offset to every one horizontal time (1H) or three horizontal times (3H) to the reference horizontal synchronization signals.

In an embodiment, the clock distribution block may distribute clock signals corresponding to the clock offset to reference horizontal synchronization signals to which the clock signals are distributed among the reference horizontal synchronization signals, respectively.

In an embodiment, the clock distribution block may distribute two or three clock signals corresponding to the clock offset to each of reference horizontal synchronization signals to which the clock signals are distributed among the reference horizontal synchronization signals.

In an embodiment, a number of clock signals distributed to at least two of reference horizontal synchronization signals to which the clock signals are distributed among the reference horizontal synchronization signals, may be same.

In an embodiment, a number of clock signals distributed to each of reference horizontal synchronization signals among the reference horizontal synchronization signals may be different.

In an embodiment, the frame time may include an active period and a porch period. The clock distribution block may distribute the clock signals corresponding to the clock offset to reference horizontal synchronization signals in the porch period among the reference horizontal synchronization signals.

A method of generating a signal according to an embodiment may include: generating reference horizontal synchronization signals based on a number of clock signals per a horizontal time; calculating a first frame clock number based on a number of the clock signals per the horizontal time; calculating a clock offset by comparing the first frame clock number and a second frame clock number generated based on a number of the clock signals per a frame time; generating horizontal synchronization signals by distributing a number of the clock signals corresponding to the clock offset to the reference horizontal synchronization signals; and generating a vertical synchronization signal based on the horizontal synchronization signals.

In an embodiment, the method may further include generating a clock gain by comparing the clock signals and reference clock signals provided from outside; and calculating the second frame clock number by multiplying the clock gain by the number of the clock signals per the frame time.

In an embodiment, the distributing the clock signals to the reference horizontal synchronization signals may include distributing the clock signals corresponding to the clock offset to every one horizontal time (1H), two horizontal time (2H), or three horizontal times (3H) to the reference horizontal synchronization signals.

In an embodiment, the distributing the clock signals to the reference horizontal synchronization signals may include distributing one, two, or three clock signals corresponding to the clock offset to each of reference horizontal synchronization signals to which the clock signals are distributed among the reference horizontal synchronization signals.

In an embodiment, in the distributing the clock signals to the reference horizontal synchronization signals, a number of clock signals distributed to each of reference horizontal synchronization signals to which the clock signals are distributed among the reference horizontal synchronization signals may be same.

In an embodiment, the frame time may include an active period and a porch period. The distributing the clock signals corresponding to the clock offset to the reference horizontal synchronization signals may include distributing the clock signals to reference horizontal synchronization signals in the porch period among the reference horizontal synchronization signals.

A display device according to an embodiment may include: a display panel including a plurality of pixels; a scan driver which provides scan signals to the pixels; a data driver which provides data signals to the pixels; a timing controller which controls a driving of the scan driver and a driving of the data driver; and a signal generator which calculates a clock offset by comparing a first frame clock number generated based on a number of clock signals per a horizontal time and a second frame clock number generated based on a number of the clock signals per a frame time, generates horizontal synchronization signals by distributing a number of the clock signals corresponding to the clock offset to reference horizontal synchronization signals, generates a vertical synchronization signal based on the horizontal synchronization signals, and provides the horizontal synchronization signals and the vertical synchronization signal to the timing controller.

In an embodiment, the signal generator may include: a reference horizontal synchronization signal generation block which generates the reference horizontal synchronization signals based on the number of clock signals per the horizontal time; a frame clock calculation block which calculates the first frame clock number based on the number of the clock signals per the horizontal time; a frame clock comparation block which calculates the clock offset by comparing the first frame clock number and the second frame clock number; a clock distribution block which generates the horizontal synchronization signals by distributing a number of the clock signals corresponding to the clock offset to the reference horizontal synchronization signals; and a vertical synchronization signal generation block which generates the vertical synchronization signal based on the horizontal synchronization signals.

In an embodiment, the signal generator may further include: a deviation detection block which generates a clock gain by comparing the clock signals and reference clock signals provided from an outside; and a clock compensation block which calculates the second frame clock number by multiplying the clock gain by the number of the clock signals per the frame time.

In the signal generator, the method of generating the signal, and the display device according to the embodiments, the clock offset may be calculated by comparing the first frame clock number generated based on the number of the clock signals per the horizontal time and the second frame clock number generated based on the number of the clock signals per the frame time, and the vertical synchronization signal may be generated based on the horizontal synchronization signals generated by distributing the number of the clock signals corresponding to the clock offset to the reference horizontal synchronization signals, so that the vertical synchronization signal, in which a calculation deviation, a temperature deviation, or the like are compensated, may be generated.

BRIEF DESCRIPTION OF THE DRAWINGS

Illustrative, non-limiting embodiments will be more clearly understood from the following detailed description taken in conjunction with the accompanying drawings.

FIG. 7 is a diagram for describing distribution of clock signals according to an embodiment.

DETAILED DESCRIPTION OF THE EMBODIMENTS

Hereinafter, signal generators, methods of generating signals, and display devices in accordance with embodiments will be explained in detail with reference to the accompanying drawings.

Figure 1:
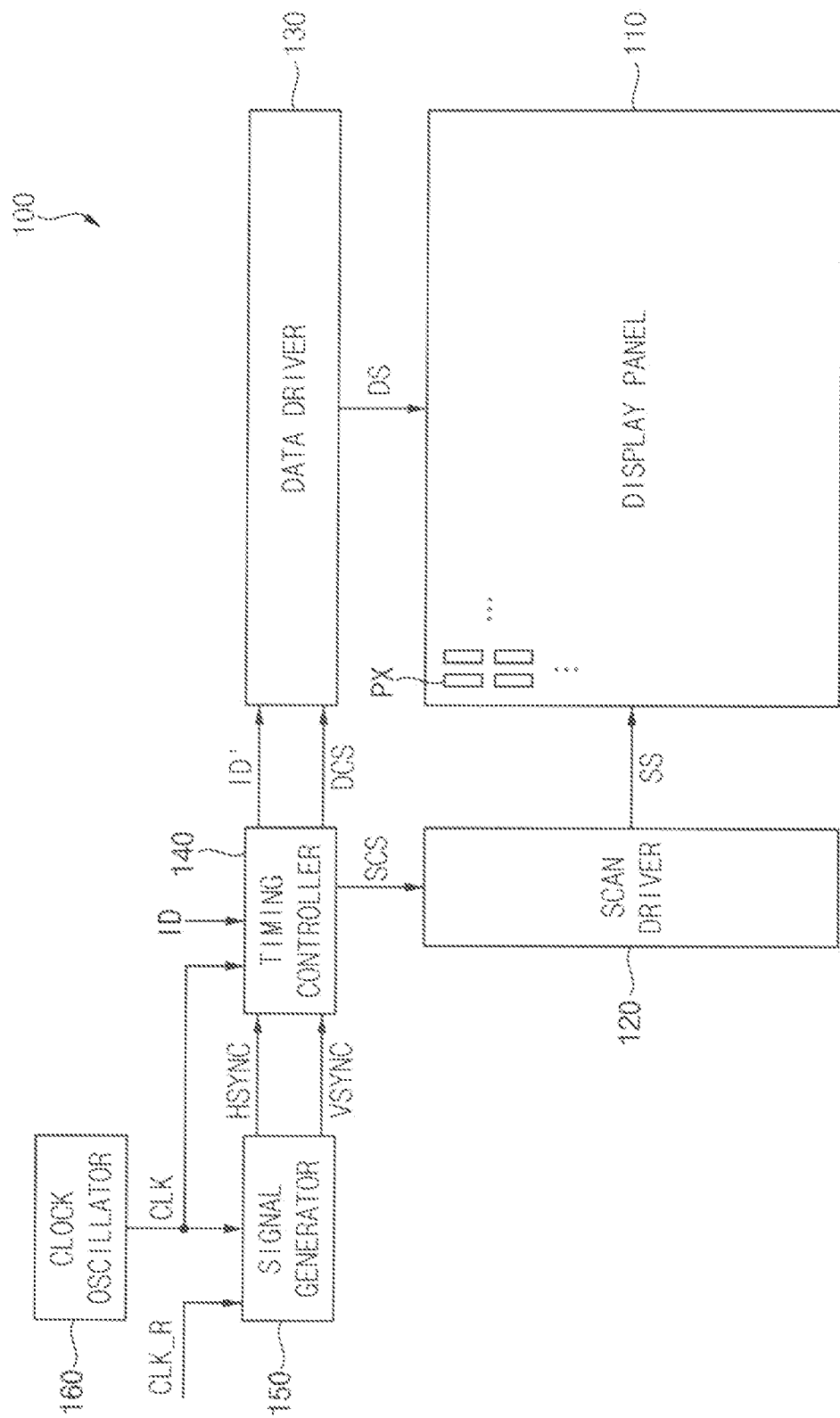
FIG. 1 is a block diagram illustrating a display device according to an embodiment.

FIG. 1 is a block diagram illustrating a display device 100 according to an embodiment.

Referring to FIG. 1, the display device 100 may include a display panel 110, a scan driver 120, a data driver 130, a timing controller 140, a signal generator 150, and a clock oscillator 160.

The display panel 110 may display an image. The display panel 110 may include a plurality of pixels PX. The pixels PX may be arranged in a substantially matrix form, and accordingly, the pixels PX may be arranged in pixel rows and pixel columns. Each of the pixels PX may emit light and the display panel 110 may display an image in which the light is combined. In an embodiment, each of the pixels PX may emit at least one of red, green, blue, and white light.

The scan driver 120 may generate scan signals SS based on a scan control signal SCS. The scan driver 120 may provide the scan signals SS to the pixels PX. The scan driver 120 may sequentially provide the scan signals SS to the pixel rows. In an embodiment, the scan driver 120 may be formed on the display panel 110 in the form of a circuit.

The data driver 130 may generate data signals DS based on a data control signal DCS and output image data ID' received from the timing controller 140. The data driver 130 may provide the data signals DS to the pixels PX. The data driver 130 may provide the data signals DS to pixel rows selected by the scan signals SS. In an embodiment, the data driver 130 may be mounted on the display panel 110 or a circuit board electrically connected to the display panel 110 in the form of a driving chip.

The timing controller 140 may control a driving of the scan driver 120 and a driving of the data driver 130. The timing controller 140 may generate the scan control signal SCS, the data control signal DCS, and the output image data ID' based on a control signal and input image data ID. The control signal may include clock signals CLK, horizontal synchronization signals HSYNC, and a vertical synchronization signal VSYNC. The timing controller 140 may provide the scan control signal SCS to the scan driver 120, and may provide the data control signal DCS and the output image data ID' to the data driver 130. In an embodiment, the timing controller 140 may be mounted on a circuit board electrically connected to the display panel 110 in the form of a driving chip.

The signal generator 150 may generate the horizontal synchronization signals HSYNC and the vertical synchronization signal VSYNC based on the clock signals CLK and a reference clock signals CLK_R. Specifically, the signal generator 150 may count the clock signals CLK to generate the horizontal synchronization signal HSYNC and may count the horizontal synchronization signals HSYNC to generate the vertical synchronization signal VSYNC. The signal generator 150 may provide the horizontal synchronization signals HSYNC and the vertical synchronization signal VSYNC to the timing controller 140. In an embodiment, the signal generator 150 may be mounted on a circuit board electrically connected to the display panel 110 in the form of a driving chip.

The clock oscillator 160 may generate the clock signals CLK having a predetermined frequency. The clock oscillator 160 may provide the clock signals CLK to the timing controller 140 and the signal generator 150.

Figure 2:
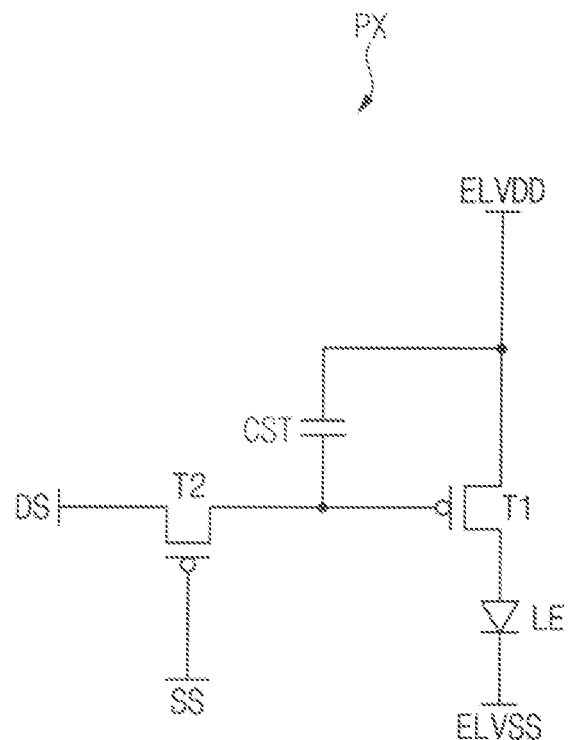
FIG. 2 is a circuit diagram illustrating a pixel included in the display device in FIG. 1.

FIG. 2 is a circuit diagram illustrating the pixel PX included in the display device 100 in FIG. 1.

Referring to FIG. 2, in an embodiment, the pixel PX may include a first transistor T1, a second transistor T2, a storage capacitor CST, and a light emitting element LE.

The first transistor T1 may provide a driving current to the light emitting element LE. A first electrode of the first transistor T1 may receive a first power voltage ELVDD, and a second electrode of the first transistor T1 may be connected to the light emitting element LE. A gate electrode of the first transistor T1 may be connected to the second transistor T2.

The second transistor T2 may provide the data signal DS to the first transistor T1 in response to the scan signal SS. A first electrode of the second transistor T2 may receive the data signal DS and a second electrode of the second transistor T2 may be connected to a gate electrode of the first transistor T1. A gate electrode of the second transistor T2 may receive the scan signal SS.

In an embodiment, as illustrated in FIG. 2, each of the first transistor T1 and the second transistor T2 may be a P-type transistor. In another embodiment, at least one of the first transistor T1 and the second transistor T2 may be an N-type transistor.

The storage capacitor CST may maintain a voltage between the first electrode and the gate electrode of the first transistor T1. A first electrode of the storage capacitor CST may be connected to the first electrode of the first transistor T1 and a second electrode of the storage capacitor CST may be connected to the gate electrode of the first transistor T1.

The light emitting element LE may emit light based on the driving current. A first electrode of the light emitting element LE may be connected to the first transistor T1 and a second electrode of the light emitting element LE may receive a second power voltage ELVSS.

In an embodiment, the light emitting element LE may be an organic light emitting diode. In another embodiment, the light emitting element LE may be an inorganic light emitting diode or a quantum dot light emitting diode.

FIG. 2 illustrates an embodiment in which the pixel PX includes two transistors and one capacitor, however, the present disclosure is not limited thereto. In another embodiment, the pixel PX may include three or more transistors and/or two or more capacitors.

Figure 3:
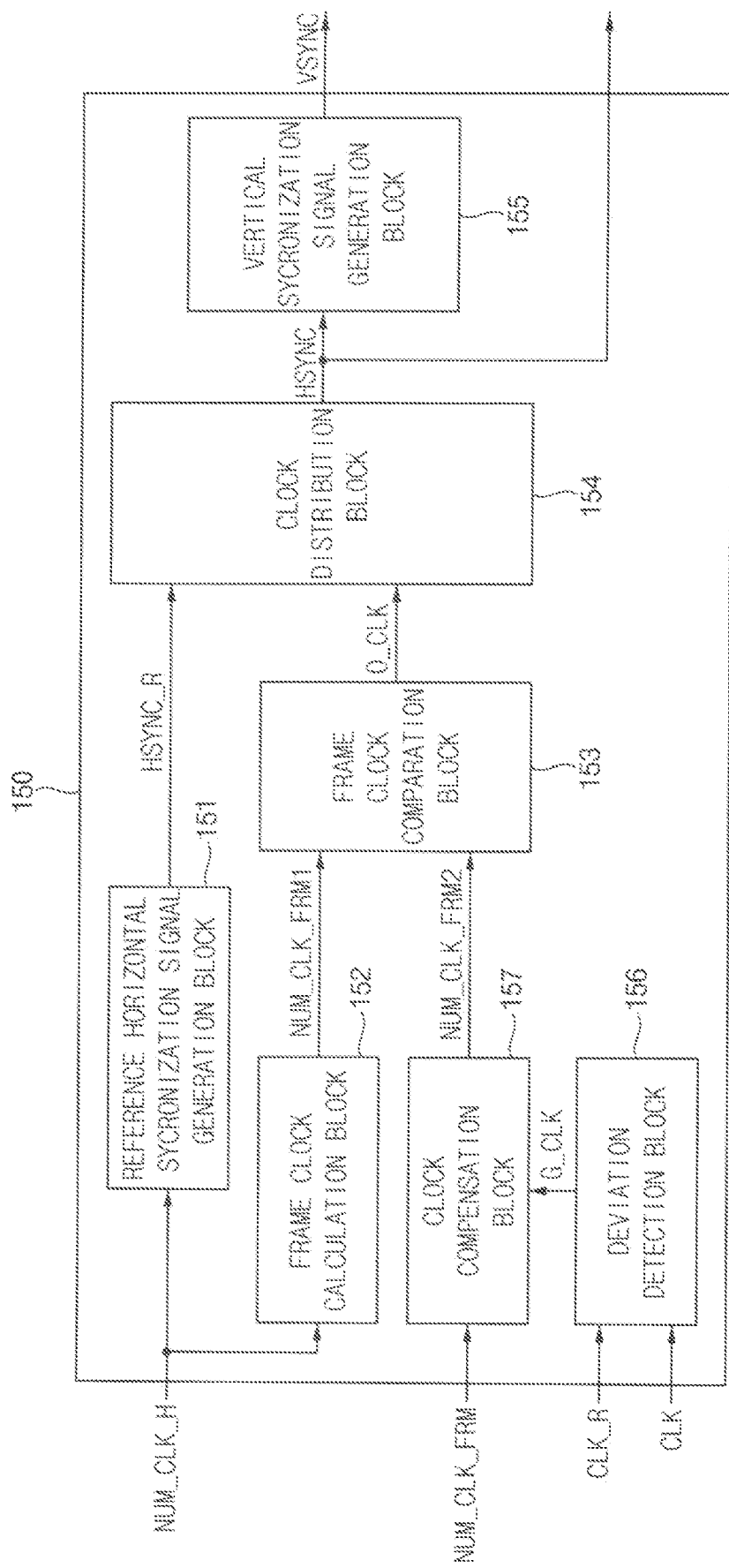
FIG. 3 is a block diagram illustrating a signal generator according to an embodiment.

FIG. 3 is a block diagram illustrating the signal generator 150 according to an embodiment.

Referring to FIG. 3, the signal generator 150 may calculate a clock offset O_CLK by comparing a first frame clock number NUM_CLK_FRM1 generated based on the number of clock signals per a horizontal time NUM_CLK_H and a second frame clock number NUM_CLK_FRM2 generated based on the number of clock signals per a frame time NUM_CLK_FRM, may generate the horizontal synchronization signals HSYNC by distributing the number of clock signals CLK corresponding to the clock offset O_CLK to the reference horizontal synchronization signals HSYNC_R, and may generate the vertical synchronization signal VSYNC based on the horizontal synchronization signals HSYNC.

The signal generator 150 may include a reference horizontal synchronization signal generation block 151, a frame clock calculation block 152, a frame clock comparation block 153, a clock distribution block 154, a vertical synchronization signal generation block 155, a deviation detection block 156, and a clock compensation block 157.

The reference horizontal synchronization signal generation block 151 may generate the reference horizontal synchronization signals HSYNC_R based on the number of the clock signals per the horizontal time NUM_CLK_H. The number of clock signals per the horizontal time NUM_CLK_H may be the number of clock signals CLK generated or transmitted during one horizontal time 1H. Each of the reference horizontal synchronization signals HSYNC_R may be a horizontal synchronization signal before compensation. The reference horizontal synchronization signal generation block 151 may provide the reference horizontal synchronization signals HSYNC_R to the clock distribution block 154.

The frame clock calculation block 152 may calculate the first frame clock number NUM_CLK_FRM1 based on the number of clock signals NUM_CLK_H per the horizontal time. Specifically, the frame clock calculation block 152 may calculate the first frame clock number NUM_CLK_FRM1 by multiplying the number of clock signals per the horizontal time NUM_CLK_H by the number of horizontal times per the frame time. For example, the frame clock calculation block 152 may calculate the first frame clock number NUM_CLK_FRM1 by multiplying the number of clock signals per the horizontal time NUM_CLK_H by the sum of the number of horizontal times per an active period and the number of horizontal times per a porch period. The frame clock calculation block 152 may provide the first frame clock number NUM_CLK_FRM1 to the frame clock comparison block 153.

The deviation detection block 156 may generate a clock gain G_CLK by comparing the clock signals CLK and reference clock signals CLK_R. The clock signals CLK may be provided from the clock oscillator 160, and accordingly, the length or a frequency of the clock signal CLK may vary depending on a temperature of the display device 100 or the like. The reference clock signals CLK_R may be provided from the outside of the display device 100, and may maintain a constant length or a constant frequency regardless of the temperature of the display device 100 or the like. For example, the reference clock signals CLK_R may be provided from an external mobile industry processor interface (MIPI) or an external reference clock oscillator. The clock gain G_CLK may be a ratio of the number of clock signals CLK per a unit time to the number of reference clock signals CLK_R per the unit time. The unit time may be a predetermined time such as 1 horizontal time (H), 1 millisecond (ms), 1 microsecond (μs), or the like. The clock gain G_CLK may mean an extent of change in the clock signals CLK according to the temperature of the display device 100 or the like. For example, when the temperature of the display device 100 increases, the frequency of the clock signals CLK may increase. The clock gain G_CLK may be 1 when no deviation occurs in the clock signals CLK and the clock gain G_CLK may be less than or greater than 1 when deviation occurs in the clock signals CLK. The deviation detection block 156 may provide the clock gain G_CLK to the clock compensation block 157.

The clock compensation block 157 may calculate the second frame clock number NUM_CLK_FRM2 by multiplying the number of clock signals per the frame time NUM_CLK_FRM by the clock gain G_CLK. The number of clock signals per the frame time NUM_CLK_FRM may be the number of clock signals CLK generated or transmitted during one frame time. The second frame clock number NUM_CLK_FRM2 may be equal to the number of clock signals per the frame time NUM_CLK_FRM when the clock gain G_CLK is 1 and the second frame clock number NUM_CLK_FRM2 may be different from the number of clock signals per the frame time NUM_CLK_FRM when the clock gain G_CLK is less than or greater than 1. The clock compensation block 157 may provide the second frame clock number NUM_CLK_FRM2 to the frame clock comparation block 153.

As described above, the length or frequency of the clock signal CLK may vary depending on the temperature of the display device 100 or the like. However, the clock gain G_CLK reflecting the ratio of the reference clock signal CLK_R, which maintains the constant length or frequency regardless of the temperature of the display device 100, and the clock signal CLK may be multiplied by the number of clock signals per the frame time NUM_CLK_FRM, so that the number of clock signals per the frame time NUM_CLK_FRM in which a deviation is generated according to the temperature of the display device 100 may be compensated to generate the second frame clock number NUM_CLK_FRM2.

The frame clock comparison block 153 may calculate the clock offset O_CLK by comparing the first frame clock number NUM_CLK_FRM1 and the second frame clock number NUM_CLK_FRM2. The first frame clock number NUM_CLK_FRM1 may be the number of clock signals CLK per the frame time for which the deviation of the clock signal CLK is not compensated, and the second frame clock number NUM_CLK_FRM2 may be the number of clock signals CLK per the frame time for which the deviation of the clock signal CLK is compensated. The clock offset O_CLK may be a difference between the first frame clock number NUM_CLK_FRM1 and the second frame clock number NUM_CLK_FRM2. The frame clock comparation block 153 may provide the clock offset O_CLK to the clock distribution block 154.

The clock distribution block 154 may generate the horizontal synchronization signals HSYNC by distributing the number of clock signals CLK corresponding to the clock offset O_CLK to the reference horizontal synchronization signals HSYNC_R. When the clock offset O_CLK is N, the clock distribution block 154 may generate the horizontal synchronization signals HSYNC by distributing N clock signals CLK to the reference horizontal synchronization signals HSYNC_R. Distribution of the clock signals CLK will be described in detail below with reference to FIGS. 4 to 11.

A deviation may occur between the first frame clock number NUM_CLK_FRM1 calculated based on the number of clock signals per the horizontal time NUM_CLK_H and the second frame clock number NUM_CLK_FRM2 calculated based on the number of clock signals per the frame time NUM_CLK_FRM2. However, the clock offset O_CLK corresponding to the deviation of the first frame clock number NUM_CLK_FRM1 and the second frame clock number NUM_CLK_FRM2 may be calculated, and the number of clock signals CLK corresponding to the clock offset O_CLK may be distributed to the reference horizontal synchronization signals HSYNC_R, the reference horizontal synchronization signals HSYNC_R generated based on the number of clock signals per the horizontal time NUM_CLK_H may be compensated to generate the horizontal synchronization signals HSYNC.

The vertical synchronization signal generation block 155 may generate the vertical synchronization signal VSYNC based on the horizontal synchronization signals HSYNC. The vertical synchronization signal generation block 155 may generate one vertical synchronization signal VSYNC corresponding to as many horizontal synchronization signals HSYNC as the number of horizontal times per the frame time.

Table 1 below illustrates the number of ideal clock signals and the number of clock signals before compensation according to an embodiment.

TABLE 1

| FRAME TIME | HORIZONTAL TIME (H) | NUMBER OF CLOCK SIGNALS | |
| --- | --- | --- | --- |
| | | IDEAL HORIZONTAL SYNCHRONIZATION SIGNAL | HORIZONTAL SYNCHRONIZATION SIGNAL BEFORE COMPENSATION |
| VERTICAL BACK PORCH PERIOD | 1 | 244.5780292 | 244 |
| | 2 | 244.5780292 | 244 |
| | 3 | 244.5780292 | 244 |
| | 4 | 244.5780292 | 244 |
| | ... | | |
| | 23 | 244.5780292 | 244 |
| | 24 | 244.5780292 | 244 |
| ACTIVE PERIOD | 25 | 244.5780292 | 244 |
| | 26 | 244.5780292 | 244 |
| | 27 | 244.5780292 | 244 |
| | 28 | 244.5780292 | 244 |
| | 29 | 244.5780292 | 244 |
| | 30 | 244.5780292 | 244 |
| | 31 | 244.5780292 | 244 |
| | 32 | 244.5780292 | 244 |
| | ... | | |
| | 2821 | 244.5780292 | 244 |
| | 2822 | 244.5780292 | 244 |
| | 2823 | 244.5780292 | 244 |
| | 2824 | 244.5780292 | 244 |
| VERTICAL FRONT PORCH PERIOD | 2825 | 244.5780292 | 244 |
| | 2826 | 244.5780292 | 244 |
| | 2827 | 244.5780292 | 244 |
| | 2828 | 244.5780292 | 244 |

In Table 1, a frequency of a frame is 60 Hz, the vertical back porch (VBP) period is 24 horizontal times (H), the active period is 2800 horizontal times (H), the vertical front porch (VFP) period is 4 horizontal times (H), and a frequency of the clock signal CLK is 41.5 MHz. In this case, the number of clock signals corresponding to the ideal horizontal synchronization signal is 244.5780292 ($=41.5*10^6/60/2828$), and the number of clock signals corresponding to the horizontal synchronization signal before compensation is 244.

In the embodiment of Table 1, the number of clock signals per the horizontal time NUM_CLK_H may be 244, and the number of clock signals per the frame time NUM_CLK_FRM may be 691,667 ($=41.5*10^6/60$). The first frame clock number NUM_CLK_FRM1 calculated in the frame clock calculation block 152 may be 690,032 ($=244*2828$), the clock gain G_CLK generated in the deviation detection block 156 may be 1, the second frame clock number NUM_CLK_FRM2 calculated in the clock compensation block 157 may be 691,667 ($=691,667*1$), and the clock offset O_CLK calculated in the frame clock comparison block 153 may be 1635 ($=691,667-690,032$). In the embodiment of Table 1, the clock distribution block 154 may generate the horizontal synchronization signals HSYNC by distributing 1635 clock signals CLK to the reference horizontal synchronization signals HSYNC_R.

In the embodiment of Table 1, the signal generator 150 may generate the horizontal synchronization signals HSYNC by compensating a deviation between a first frame clock number NUM_CLK_FRM1 calculated based on the number of clock signals per the horizontal time NUM_CLK_H and the second frame clock number NUM_CLK_FRM2 which is equal to the number of clock signals per the frame time NUM_CLK_FRM, so that the vertical synchronization signal VSYNC, in which a calculation deviation is compensated, may be generated.

In an embodiment, the first frame clock number NUM_CLK_FRM1 may be 9,974, the number of clock signals per the frame time NUM_CLK_FRM may be 10,000, and the ratio of the reference clock signal CLK_R and the clock signal CLK may be 100.02%. In the above embodiment, the clock gain G_CLK generated in the deviation detection block 156 may be 1.0002, the second frame clock number NUM_CLK_FRM2 calculated in the clock compensation block 157 may be 10,002 ($=10,000*1.0002$), and the clock offset O_CLK calculated in the frame clock comparison block 153 may be 28 ($=10,002-9,974$). In the above embodiment, the clock distribution block 154 may generate the horizontal synchronization signals HSYNC by distributing 28 clock signals CLK to the reference horizontal synchronization signals HSYNC_R. In the above embodiment, when the number of clock signals per the frame time NUM_CLK_FRM is not compensated according to the ratio of the reference clock signal CLK_R and the clock signal CLK, the clock offset O_CLK may be 26 ($=10,000-9,974$).

In the above embodiment, the signal generator 150 may generate the horizontal synchronization signals HSYNC by compensating a deviation between the first frame clock number NUM_CLK_FRM1 calculated based on the number of clock signals per the horizontal time NUM_CLK_H and the second frame clock number NUM_CLK_FRM2 calculated by compensating the number of clock signals per the frame time NUM_CLK_FRM based on the ratio of the reference clock signal CLK_R and the clock signal CLK, so that the vertical synchronization signal VSYNC, in which a calculation deviation and a temperature deviation are compensated, may be generated.

Hereinafter, distribution of clock signals according to embodiments of the present disclosure will be described with reference to FIGS. 4 to 11.

Figure 4:
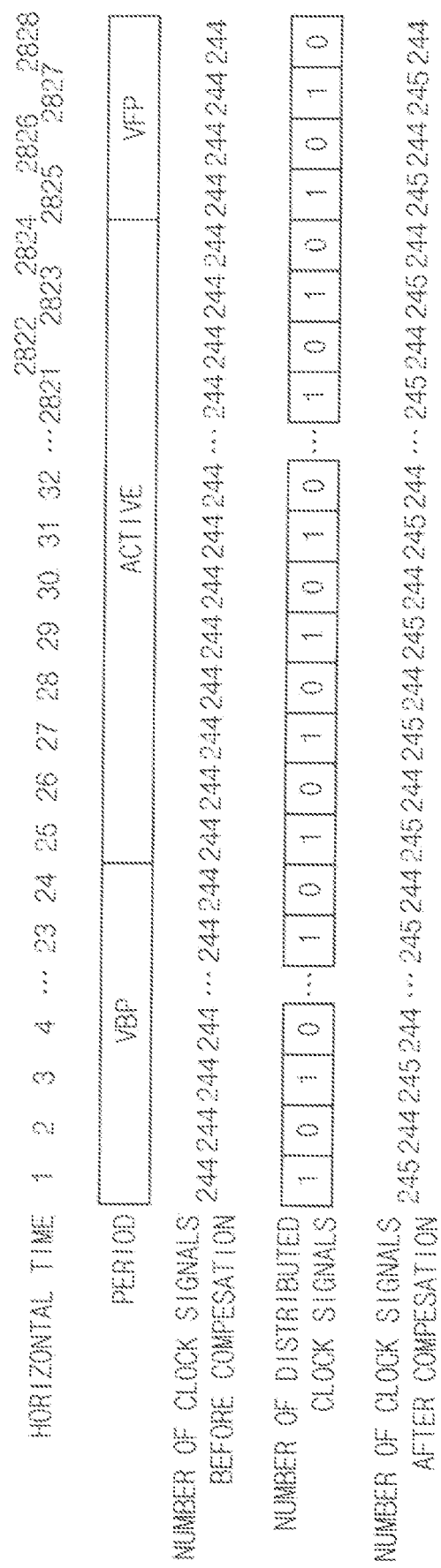
FIGS. 4 and 5 are diagrams for describing distribution of clock signals according to an embodiment.
Figure 5:
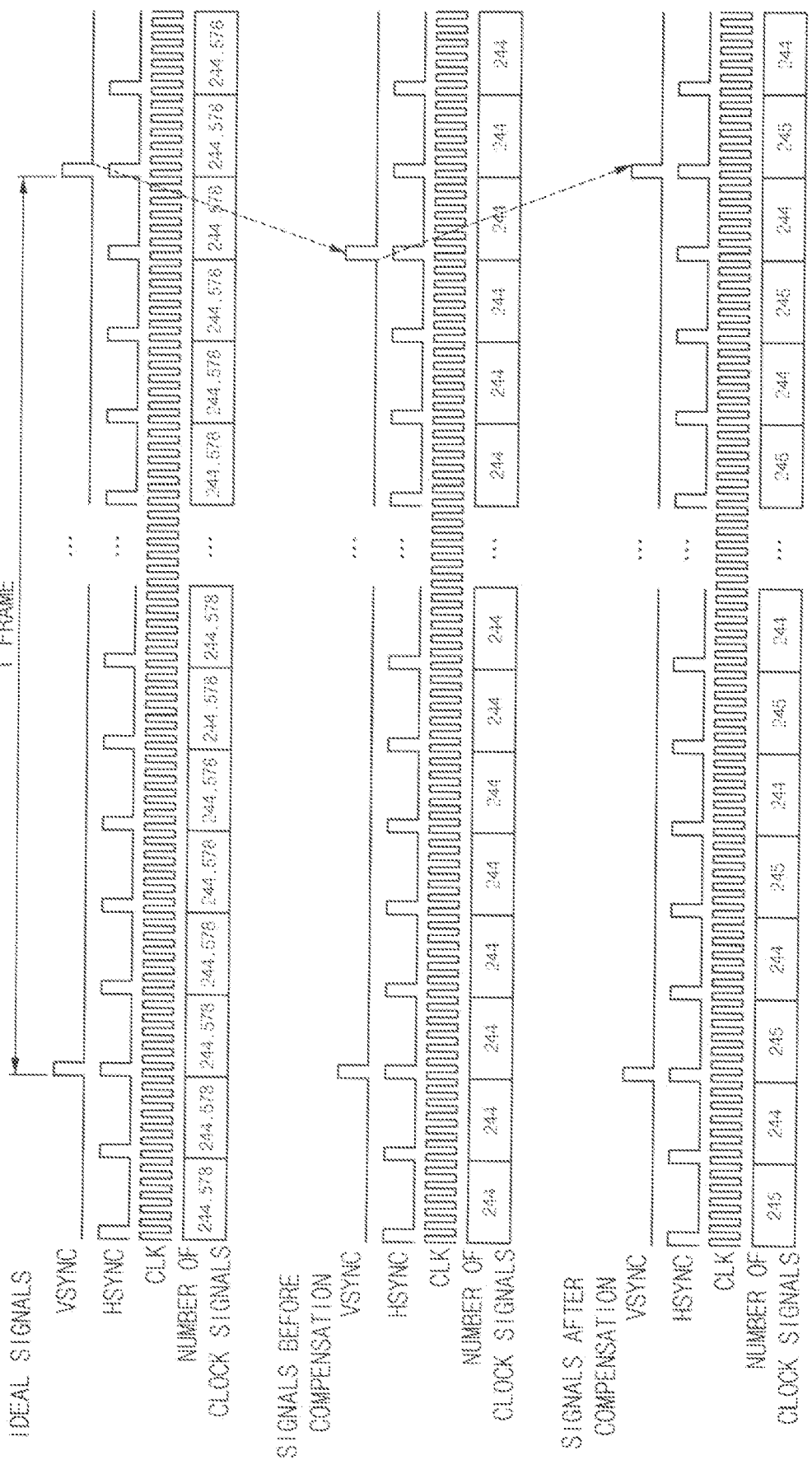

FIGS. 4 and 5 are diagrams for describing distribution of clock signals according to an embodiment.

Referring to FIGS. 4 and 5, in an embodiment, the clock distribution block 154 may distribute the number of clock signals CLK corresponding to the clock offset O_CLK every two horizontal times (2H) to the reference horizontal synchronization signals HSYNC_R. For example, the clock distribution block 154 may distribute the number of clock signals CLK corresponding to the clock offset O_CLK every odd-numbered horizontal times to the reference horizontal synchronization signals HSYNC_R and may not distribute the clock signals CLK every even-numbered horizontal times.

In an embodiment, the clock distribution block 154 may distribute one clock signal CLK to each of reference horizontal synchronization signals HSYNC_R to which the clock signals CLK are distributed among the reference horizontal synchronization signals HSYNC_R.

In an embodiment, the number of clock signals CLK distributed to each of reference horizontal synchronization signals HSYNC_R to which the clock signals CLK are distributed may be same. For example, the clock distribution block 154 may distribute one clock signal CLK to every two horizontal times (2H).

As illustrated in FIG. 5, a deviation may exist between the ideal number of clock signals CLK per the horizontal time and the number of clock signals CLK per the horizontal time before compensation. Accordingly, a deviation may occur between the vertical synchronization signal VSYNC generated based on the ideal number of clock signals CLK per the horizontal time and the vertical synchronization signal VSYNC generated based on the number of clock signals CLK per the horizontal time before compensation. However, the signal generator 150 according to embodiments of the present disclosure may calculate the clock offset O_CLK by comparing the first frame clock number NUM_CLK_FRM1 generated based on the number of clock signals per the horizontal time NUM_CLK_H and the second frame clock number NUM_CLK_FRM2 generated based on the number of clock signals per the frame time NUM_CLK_FRM, may generate the horizontal synchronization signals HSYNC by distributing the number of clock signals CLK corresponding to the clock offset O_CLK to the reference horizontal synchronization signals HSYNC_R, and may generate the vertical synchronization signal VSYNC based on the horizontal synchronization signals HSYNC, so that the vertical synchronization signal VSYNC, whose deviation from the synchronization signal VSYNC generated based on the ideal number of clock signals CLK per the horizontal time is reduced or substantially prevented, may be generated.

Figure 6:
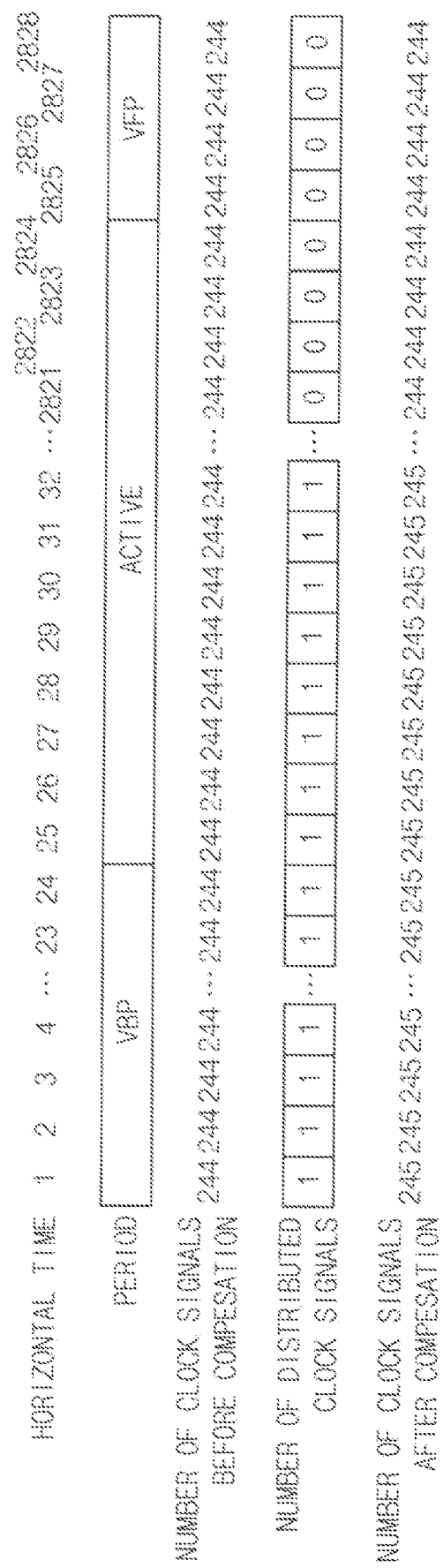
FIG. 6 is a diagram for describing distribution of clock signals according to an embodiment.

FIG. 6 is a diagram for describing distribution of clock signals according to an embodiment.

Referring to FIG. 6, in an embodiment, the clock distribution block 154 may distribute the number of clock signals CLK corresponding to the clock offset O_CLK every one horizontal time 1H to the reference horizontal synchronization signals HSYNC_R. For example, the clock distribution block 154 may distribute the number of clock signals CLK corresponding to the clock offset O_CLK every horizontal times to the reference horizontal synchronization signals HSYNC_R.

In an embodiment, the clock distribution block 154 may distribute the number of clock signals CLK corresponding to the clock offset O_CLK from a first horizontal time to the reference horizontal synchronization signals HSYNC_R. For example, when one frame time includes first to $2828^{th}$ horizontal times, the number of distributed clock signals CLK is N, and one clock signal CLK is distributed to each of reference horizontal synchronization signals HSYNC_R to which the clock signals CLK are distributed among the reference horizontal synchronization signals HSYNC_R, the clock distribution block 154 may distribute one clock signal CLK to each of the reference horizontal synchronization signals HSYNC_R every first to $N^{th}$ horizontal times and may not distribute the clock signals CLK to the reference horizontal synchronization signals HSYNC_R in $N+1^{th}$ to $2828^{th}$ horizontal times.

FIG. 7 is a diagram for describing distribution of clock signals according to an embodiment.

Referring to FIG. 7, in an embodiment, the clock distribution block 154 may distribute the number of clock signals CLK corresponding to the clock offset O_CLK every 3 horizontal times (3H) to the reference horizontal synchronization signals HSYNC_R. For example, the clock distribution block 154 may distribute the number of clock signals CLK corresponding to the clock offset O_CLK to the reference horizontal synchronization signals HSYNC_R every $(3N-2)^{th}$ horizontal times, and may not distribute the clock signals CLK every $(3N-1)^{th}$ and $3N^{th}$ horizontal times, where N is a natural number.

In the distribution of clock signals described with reference to FIGS. 4 to 7, embodiments in which the clock distribution block 154 distributes the number of clock signals CLK corresponding to the clock offset O_CLK to every 1 horizontal time (1H), 2 horizontal times (2H), or 3 horizontal times (3H) to the reference horizontal synchronization signals HSYNC_R are described, however, periods in which the clock signals CLK are distributed is not limited thereto. In other embodiments, the clock distribution block 154 may distribute the number of clock signals CLK corresponding to the clock offset O_CLK every horizontal times greater than or equal to 4 horizontal times 4H to the reference horizontal synchronization signals HSYNC_R.

Figure 8:
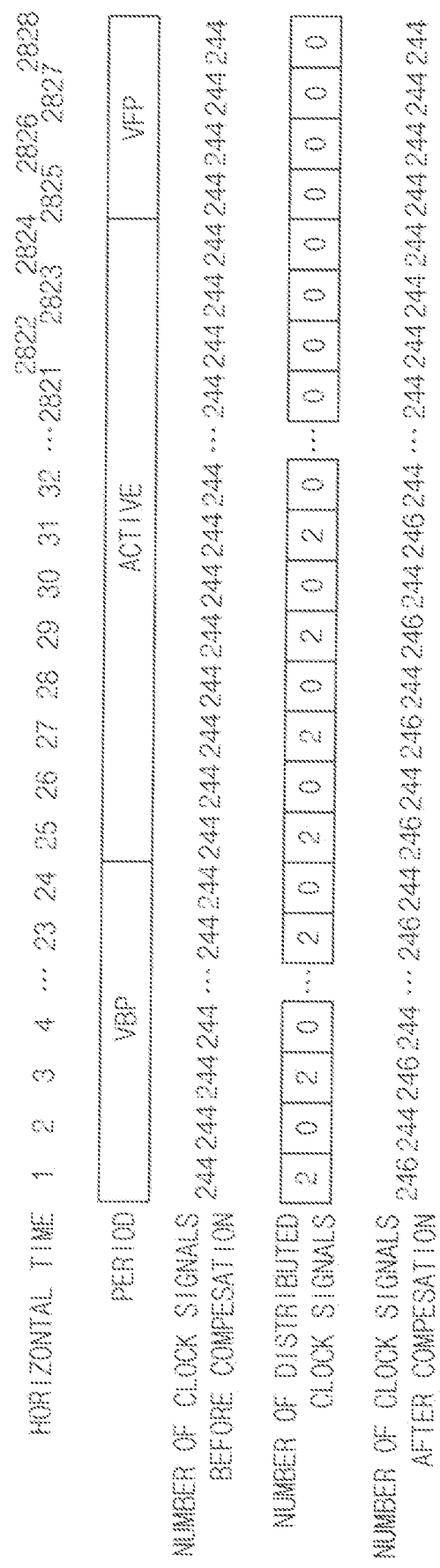
FIG. 8 is a diagram for describing distribution of clock signals according to an embodiment.

FIG. 8 is a diagram for describing distribution of clock signals according to an embodiment.

Referring to FIG. 8, in an embodiment, the clock distribution block 154 may distribute two clock signals CLK to each of reference horizontal synchronization signals HSYNC_R to which the clock signals CLK are distributed among the reference horizontal synchronization signals HSYNC_R. For example, the clock distribution block 154 may distribute two clock signals CLK to each of the reference horizontal synchronization signals HSYNC_R every two horizontal times (2H).

Figure 9:
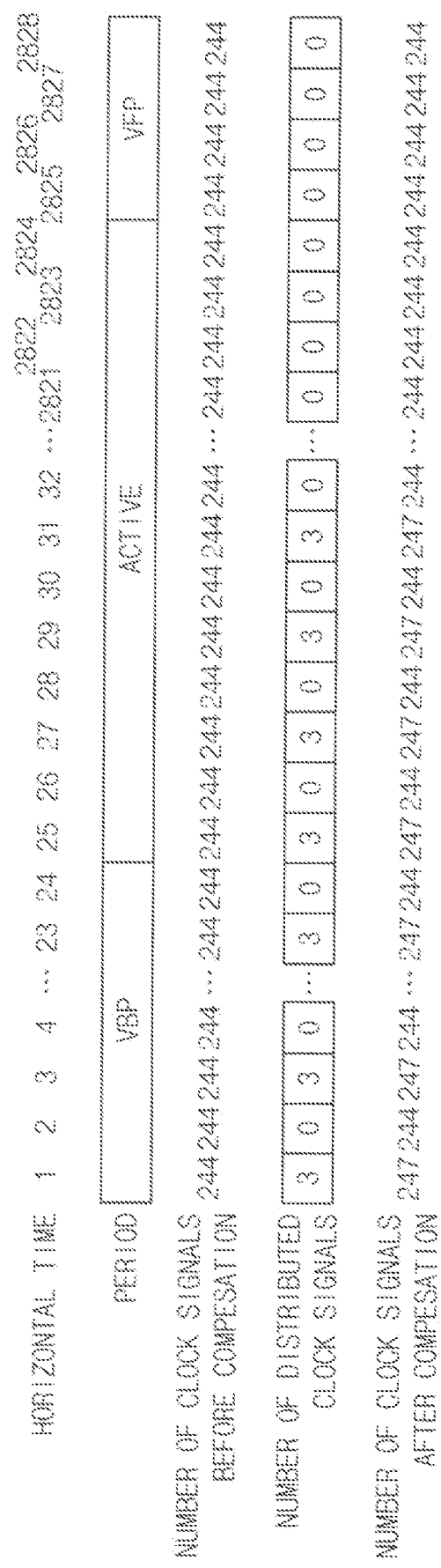
FIG. 9 is a diagram for describing distribution of clock signals according to an embodiment.

FIG. 9 is a diagram for describing distribution of clock signals according to an embodiment.

Referring to FIG. 9, in an embodiment, the clock distribution block 154 may distribute three clock signals CLK to each of reference horizontal synchronization signals HSYNC_R to which the clock signals CLK are distributed among the reference horizontal synchronization signals HSYNC_R. For example, the clock distribution block 154 may distribute three clock signals CLK to each of the reference horizontal synchronization signals HSYNC_R every two horizontal times (2H).

Figure 10:
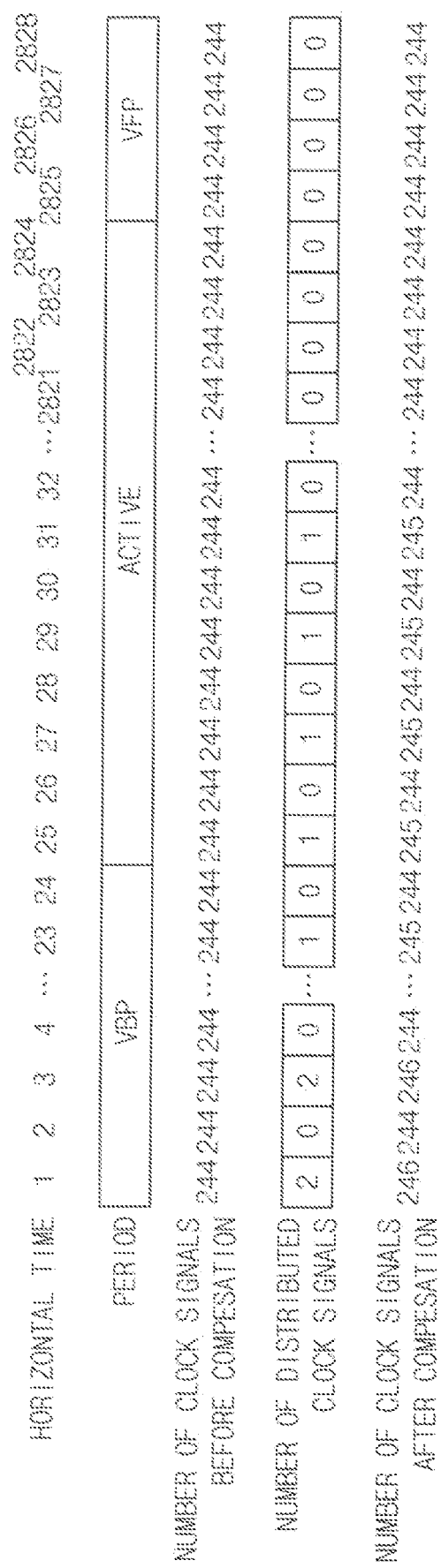
FIG. 10 is a diagram for describing distribution of clock signals according to an embodiment.

FIG. 10 is a diagram for describing distribution of clock signals according to an embodiment.

Referring to FIG. 10, in an embodiment, the number of clock signals CLK distributed to at least two of reference horizontal synchronization signals HSYNC_R to which the clock signals CLK are distributed may be different. For example, the clock distribution block 154 may distribute two clock signals CLK to each of first reference horizontal synchronization signals which are some of the reference horizontal synchronization signals HSYNC_R to which the clock signals CLK are distributed, may distribute one clock signal CLK to each of second reference horizontal synchronization signals which are some of the reference horizontal synchronization signals HSYNC_R to which the clock signals CLK are distributed, and may not distribute clock signal CLK to the others of the reference horizontal synchronization signals HSYNC_R.

Figure 11:
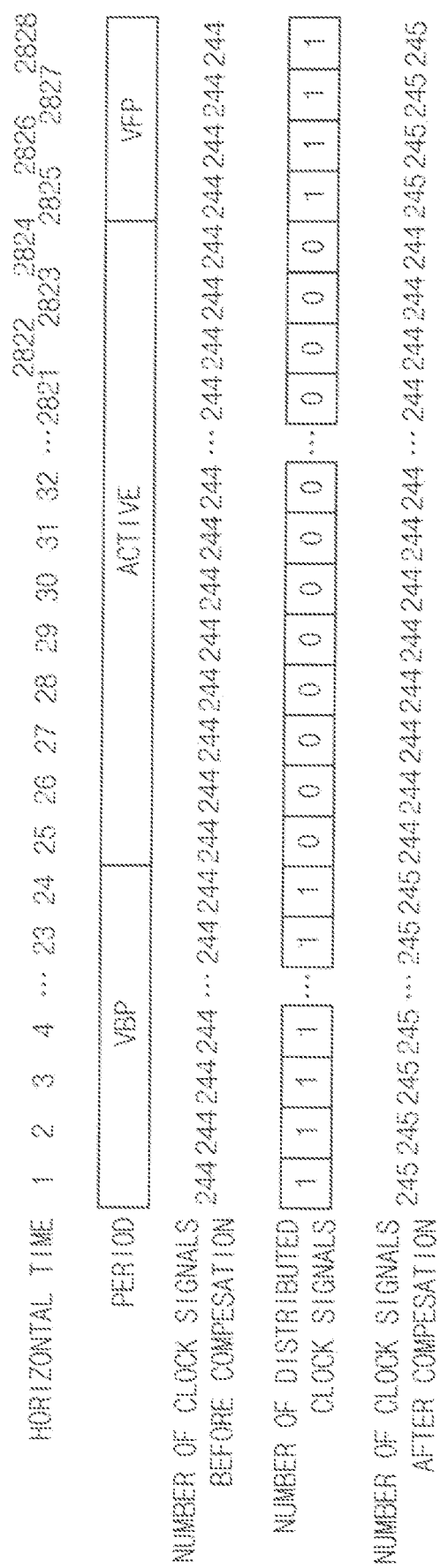
FIG. 11 is a diagram for describing distribution of clock signals according to an embodiment.

FIG. 11 is a diagram for describing distribution of clock signals according to an embodiment.

Referring to FIG. 11, a frame time may include an active period and a porch period, and the porch period may include a vertical back porch (VBP) period and a vertical front porch (VFP) period. In an embodiment, the clock distribution block 154 may distribute the clock signals CLK to reference horizontal synchronization signals VSYNC_R within the porch period among the reference horizontal synchronization signals VSYNC_R. The clock distribution block 154 may not distribute the clock signals CLK to reference horizontal synchronization signals VSYNC_R in the active period among the reference horizontal synchronization signals VSYNC_R. In the above embodiment, since the clock signals CLK are not distributed to the reference horizontal synchronization signals VSYNC_R in the active period, the number of clock signals CLK of each of the horizontal synchronization signals VSYNC_R in the active period may be equal. Accordingly, occurrence of luminance deviations between pixel rows in the active period in which the pixels PX emit light may be prevented.

Figure 12:
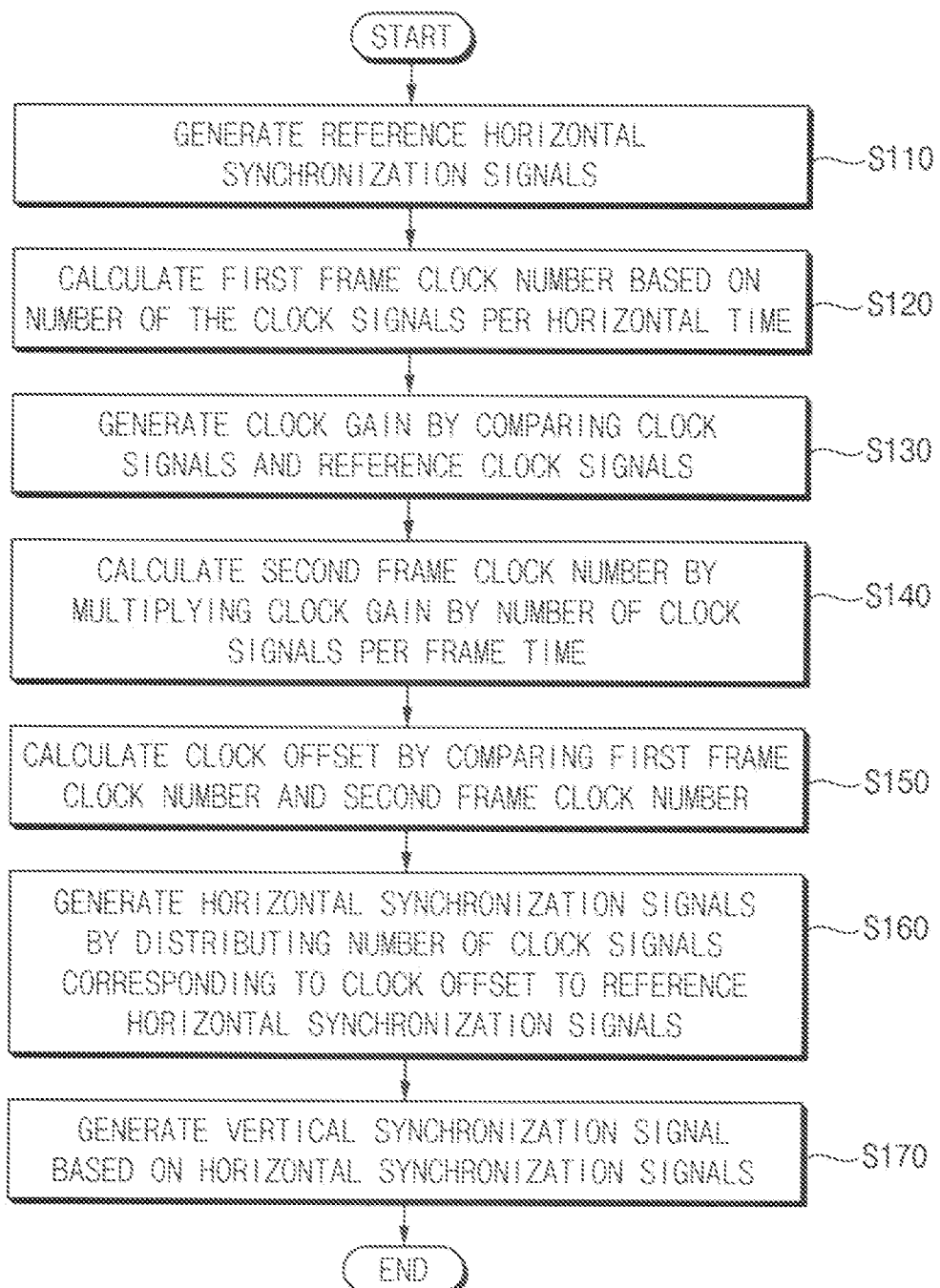
FIG. 12 is a flowchart illustrating a method of generating a signal according to an embodiment.

FIG. 12 is a flowchart illustrating a method of generating a signal according to an embodiment.

Referring to FIGS. 3 and 12, the reference horizontal synchronization signal generation block 151 may generate the reference horizontal synchronization signals HSYNC_R based on the number of clock signals per the horizontal time NUM_CLK_H (S110). The number of clock signals NUM_CLK_H per the horizontal time may be the number of clock signals CLK generated or transmitted during one horizontal time 1H.

The frame clock calculation block 152 may calculate the first frame clock number NUM_CLK_FRM1 based on the number of clock signals per the horizontal time NUM_CLK_H (S120). Specifically, the frame clock calculation block 152 may calculate the first frame clock number NUM_CLK_FRM1 by multiplying the number of clock signals per the horizontal time NUM_CLK_H by the number of horizontal times per the frame time.

The deviation detection block 156 may generate the clock gain G_CLK by comparing the clock signal CLK and the reference clock signal CLK_R provided from the outside (S130). The clock gain G_CLK may be a ratio of the number of clock signals CLK per the unit time and the number of reference clock signals CLK_R per the unit time.

The clock compensation block 157 may calculate the second frame clock number NUM_CLK_FRM2 by multiplying the number of clock signals per the frame time NUM_CLK_FRM by the clock gain G_CLK (S140). The number of clock signals per the frame time NUM_CLK_FRM may be the number of clock signals CLK generated or transmitted during one frame time.

The frame clock comparation block 153 may calculate the clock offset O_CLK by comparing the first frame clock number NUM_CLK_FRM1 and the second frame clock number NUM_CLK_FRM2 (S150). The clock offset O_CLK may be a difference between the number of first frame clocks NUM_CLK_FRM1 and the number of second frame clocks NUM_CLK_FRM2.

The clock distribution block 154 may generate the horizontal synchronization signals HSYNC by distributing the number of clock signals CLK corresponding to the clock offset O_CLK to the reference horizontal synchronization signals HSYNC_R (S160).

In an embodiment, the clock distribution block 154 may distribute the number of clock signals CLK corresponding to the clock offset O_CLK every two horizontal times (2H) to the reference horizontal synchronization signals HSYNC_R. In another embodiment, the clock distribution block 154 may distribute the number of clock signals CLK corresponding to the clock offset O_CLK every one horizontal time (1H) or three horizontal times (3H) to the reference horizontal synchronization signals HSYNC_R. In still another embodiment, the clock distribution block 154 may distribute the number of clock signals CLK corresponding to the clock offset O_CLK every horizontal times greater than or equal to four horizontal times (4H) to the reference horizontal synchronization signals HSYNC_R.

In an embodiment, the clock distribution block 154 may distribute one clock signal CLK to each of reference horizontal synchronization signals HSYNC_R to which the clock signals CLK are distributed among the reference horizontal synchronization signals HSYNC_R. In another embodiment, the clock distribution block 154 may distribute two or three clock signals CLK to each of reference horizontal synchronization signals HSYNC_R to which the clock signals CLK are distributed among the reference horizontal synchronization signals HSYNC_R.

In an embodiment, the number of clock signals CLK distributed to each of reference horizontal synchronization signals HSYNC_R to which the clock signals CLK are distributed among the reference horizontal synchronization signals HSYNC_R may be same. In another embodiment, the number of clock signals CLK distributed to each of reference horizontal synchronization signals HSYNC_R to which the clock signals CLK are distributed among the reference horizontal synchronization signals HSYNC_R may be variable.

In an embodiment, the clock distribution block 154 may distribute the clock signals CLK to reference horizontal synchronization signals VSYNC_R in the porch period among the reference horizontal synchronization signals VSYNC_R. The clock distribution block 154 may not distribute the clock signals CLK to reference horizontal synchronization signals VSYNC_R in the active period among the reference horizontal synchronization signals VSYNC_R.

The vertical synchronization signal generation block 155 may generate the vertical synchronization signal VSYNC based on the horizontal synchronization signals HSYNC (S170). The vertical synchronization signal generation block 155 may generate one vertical synchronization signal VSYNC corresponding to as many horizontal synchronization signals HSYNC as the number of horizontal times per the frame time.

In the prior art, in order to generate an accurate vertical synchronization signal, a clock recovery circuit such as a phase locked loop (PLL) circuit, a delay locked loop (DLL) circuit, or the like may be used. In this case, the size of a driving chip including a signal generator may increase, and power consumption of the driving chip may increase.

In the embodiments of the present disclosure, the clock offset may be calculated by comparing the first frame clock number generated based on the number of clock signals per the horizontal time and the second frame clock number generated based on the number of clock signals per the frame time, and the vertical synchronization signal may be generated based on the horizontal synchronization signals generated by distributing the number of clock signals corresponding to the clock offset to the reference horizontal synchronization signals, so that an accurate vertical synchronization signal may be generated without an increase in size and power consumption of a driving chip including a signal generator.

The display device according to the embodiments may be applied to a display device included in a computer, a notebook, a mobile phone, a smart phone, a smart pad, a PMP, a PDA, an MP3 player, or the like.

Although the signal generators, the methods of generating the signals, and the display devices according to the embodiments have been described with reference to the drawings, the illustrated embodiments are examples, and may be modified and changed by a person having ordinary knowledge in the relevant technical field without departing from the technical spirit described in the following claims.

What is claimed is:

1. A signal generator, comprising:
   a reference horizontal synchronization signal generation block which generates reference horizontal synchronization signals based on a number of clock signals per a horizontal time;
   a frame clock calculation block which calculates a first frame clock number based on a number of the clock signals per the horizontal time;
   a frame clock comparation block which calculates a clock offset by comparing the first frame clock number and a second frame clock number generated based on a number of the clock signals per a frame time;
   a clock distribution block which generates horizontal synchronization signals by distributing a number of the clock signals corresponding to the clock offset to the reference horizontal synchronization signals; and
   a vertical synchronization signal generation block which generates a vertical synchronization signal based on the horizontal synchronization signals.

2. The signal generator of claim 1, further comprising:
   a deviation detection block which generates a clock gain by comparing the clock signals and reference clock signals provided from outside; and
   a clock compensation block which calculates the second frame clock number by multiplying the clock gain by the number of the clock signals per the frame time.

3. The signal generator of claim 2, wherein the clock gain is a ratio of a number of the clock signals per a unit time to a number of the reference clock signals per the unit time.

4. The signal generator of claim 1, wherein the clock offset is a difference between the first frame clock number and the second frame clock number.

5. The signal generator of claim 1, wherein the clock distribution block distributes the clock signals corresponding to the clock offset to every two horizontal times (2H) to the reference horizontal synchronization signals.

6. The signal generator of claim 1, wherein the clock distribution block distributes the clock signals corresponding to the clock offset to every one horizontal time (1H) or three horizontal times (3H) to the reference horizontal synchronization signals.

7. The signal generator of claim 1, wherein the clock distribution block distributes clock signals corresponding to the clock offset to reference horizontal synchronization signals to which the clock signals are distributed among the reference horizontal synchronization signals, respectively.

8. The signal generator of claim 1, wherein the clock distribution block distributes two or three clock signals corresponding to the clock offset to each of reference horizontal synchronization signals to which the clock signals are distributed among the reference horizontal synchronization signals.

9. The signal generator of claim 1, wherein a number of clock signals distributed to each of reference horizontal synchronization signals to which the clock signals are distributed among the reference horizontal synchronization signals is same.

10. The signal generator of claim 1, wherein a number of clock signals distributed to at least two of reference horizontal synchronization signals among the reference horizontal synchronization signals is different.

11. The signal generator of claim 1, wherein the frame time includes an active period and a porch period, and
    wherein the clock distribution block distributes the clock signals corresponding to the clock offset to reference horizontal synchronization signals in the porch period among the reference horizontal synchronization signals.

12. A method of generating a signal, the method comprising:
    generating reference horizontal synchronization signals based on a number of clock signals per a horizontal time;
    calculating a first frame clock number based on a number of the clock signals per the horizontal time;
    calculating a clock offset by comparing the first frame clock number and a second frame clock number generated based on a number of the clock signals per a frame time;
    generating horizontal synchronization signals by distributing a number of the clock signals corresponding to the clock offset to the reference horizontal synchronization signals; and
    generating a vertical synchronization signal based on the horizontal synchronization signals.

13. The method of claim 12, further comprising:
    generating a clock gain by comparing the clock signals and reference clock signals provided from outside; and
    calculating the second frame clock number by multiplying the clock gain by the number of the clock signals per the frame time.

14. The method of claim 12, wherein the distributing the clock signals to the reference horizontal synchronization signals includes distributing the clock signals corresponding to the clock offset to every one horizontal time (1H), two horizontal time (2H), or three horizontal times (3H) to the reference horizontal synchronization signals.

15. The method of claim 12, wherein the distributing the clock signals to the reference horizontal synchronization signals includes distributing one, two, or three clock signals corresponding to the clock offset to each of reference horizontal synchronization signals to which the clock signals are distributed among the reference horizontal synchronization signals.

16. The method of claim 12, wherein, in the distributing the clock signals to the reference horizontal synchronization signals, a number of clock signals distributed to each of reference horizontal synchronization signals to which the clock signals are distributed among the reference horizontal synchronization signals is same.

17. The method of claim 12, wherein the frame time includes an active period and a porch period, and
    wherein the distributing the clock signals corresponding to the clock offset to the reference horizontal synchronization signals includes distributing the clock signals to reference horizontal synchronization signals in the porch period among the reference horizontal synchronization signals.

18. A display device, comprising:
a display panel including a plurality of pixels;
a scan driver which provides scan signals to the pixels;
a data driver which provides data signals to the pixels;
a timing controller which controls a driving of the scan driver and a driving of the data driver; and
a signal generator which calculates a clock offset by comparing a first frame clock number generated based on a number of clock signals per a horizontal time and a second frame clock number generated based on a number of the clock signals per a frame time, generates horizontal synchronization signals by distributing a number of the clock signals corresponding to the clock offset to reference horizontal synchronization signals, generates a vertical synchronization signal based on the horizontal synchronization signals, and provides the horizontal synchronization signals and the vertical synchronization signal to the timing controller.

19. The display device of claim 18, wherein the signal generator includes:
a reference horizontal synchronization signal generation block which generates the reference horizontal synchronization signals based on the number of clock signals per the horizontal time;
a frame clock calculation block which calculates the first frame clock number based on the number of the clock signals per the horizontal time;
a frame clock comparation block which calculates the clock offset by comparing the first frame clock number and the second frame clock number;
a clock distribution block which generates the horizontal synchronization signals by distributing a number of the clock signals corresponding to the clock offset to the reference horizontal synchronization signals; and
a vertical synchronization signal generation block which generates the vertical synchronization signal based on the horizontal synchronization signals.

20. The display device of claim 19, wherein the signal generator further includes:
a deviation detection block which generates a clock gain by comparing the clock signals and reference clock signals provided from an outside; and
a clock compensation block which calculates the second frame clock number by multiplying the clock gain by the number of the clock signals per the frame time.

* * * * *